US012697814B2

(12) United States Patent
Morimoto et al.

(10) Patent No.: US 12,697,814 B2
(45) Date of Patent: Aug. 4, 2026

(54) HEAD MODULE

(71) Applicant: BROTHER KOGYO KABUSHIKI KAISHA, Nagoya (JP)

(72) Inventors: Itsuki Morimoto, Inazawa (JP); Yuki Kawamura, Nisshin (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 132 days.

(21) Appl. No.: 18/611,002

(22) Filed: Mar. 20, 2024

(65) Prior Publication Data

US 2024/0326425 A1 Oct. 3, 2024

(30) Foreign Application Priority Data

Mar. 30, 2023 (JP) ................................ 2023-054636

(51) Int. Cl.
*B41J 2/14* (2006.01)

(52) U.S. Cl.
CPC .. *B41J 2/14233* (2013.01); *B41J 2002/14266* (2013.01); *B41J 2202/16* (2013.01)

(58) Field of Classification Search
CPC .......... B41J 2202/20; B41J 2002/14491; B41J 2/14427; B41J 2002/14266; B41J 2202/19; B41J 2202/12; B41J 2202/08; B41J 2002/14362; B41J 2002/14459; B41J 2/14233; B41J 29/377; B41J 2202/16
See application file for complete search history.

(56) References Cited

U.S. PATENT DOCUMENTS

| | | | | |
|---|---|---|---|---|
| 2018/0281436 | A1 | 10/2018 | Mori | |
| 2018/0311958 | A1* | 11/2018 | Ishizaki | B41J 2/18 |
| 2020/0101737 | A1 | 4/2020 | Nishii | |
| 2020/0384772 | A1* | 12/2020 | Hayashi | B41J 2/14233 |
| 2022/0305787 | A1 | 9/2022 | Okubo et al. | |

FOREIGN PATENT DOCUMENTS

| | | |
|---|---|---|
| JP | 2013-63555 A | 4/2013 |
| JP | 2018-171856 A | 11/2018 |

OTHER PUBLICATIONS

Extended European Search Report for European Patent Application No. 24162541.7 (Aug. 13, 2024).

* cited by examiner

*Primary Examiner* — Jannelle M Lebron
(74) *Attorney, Agent, or Firm* — Kenealy Vaidya LLP

(57) ABSTRACT

A head module includes: a head chip having an actuator, a channel member having a channel deformable by the actuator, and a support made of metal and supporting the channel member, a heater assembly; and a heat conductor. The heat conductor has a first contacting part in thermal contact with the support, and a second contacting part in thermal contact with the heater assembly and the actuator.

10 Claims, 5 Drawing Sheets

HEAD MODULE

REFERENCE TO RELATED APPLICATIONS

This application claims priority from Japanese Patent Application No. 2023-054636 filed on Mar. 30, 2023. The entire content of the priority application is incorporated herein by reference.

BACKGROUND ART

Conventionally, there is a known head provided with a channel member, a piezoelectric actuator and a heater. In this head, the channel member is joined to a surface of the piezoelectric actuator, and the heater has a projecting part which is in thermal contact with another surface of the piezoelectric actuator. The projecting part is in thermal contact with an area between an outer edge of the piezoelectric actuator and a plurality of individual electrodes, in the another surface of the piezoelectric actuator. With this, the temperature of ink in the channel member is uniformized, thereby suppressing any lowering in an image quality.

SUMMARY

In the head described above, however, there is no mechanism configured to release heat generated by driving of the piezoelectric actuator. With this, there is such a problem that the temperature of the piezoelectric actuator is raised continuously by the piezoelectric actuator which is continuously driven.

The present teaching is made to solve the above-described problem, and an object of the present teaching is to provide a head module which is capable of suppressing the raising in the temperature of a piezoelectric actuator due to the driving of the piezoelectric actuator, while uniformizing a temperature of a liquid inside a channel member.

According to an aspect of the present teaching, there is provided a head module including: a head chip having an actuator, a channel member having a channel deformable by the actuator, and a support made of metal and supporting the channel member; a heater assembly; and a heat conductor. The heat conductor has a first contacting part in thermal contact with the support, and a second contacting part in thermal contact with the heater assembly and the actuator.

According to the head module of the present teaching, it is possible to suppress the raising in the temperature of the actuator due to the driving of the actuator, while uniformizing the temperature of the liquid inside the channel member.

DESCRIPTION

In the following, an explanation will be given regarding a head module 1 according to an embodiment of the present teaching, with a case wherein the head module 1 is used in a printer (printing apparatus) 1000, as an example.

Printer 1000

Figure 1:
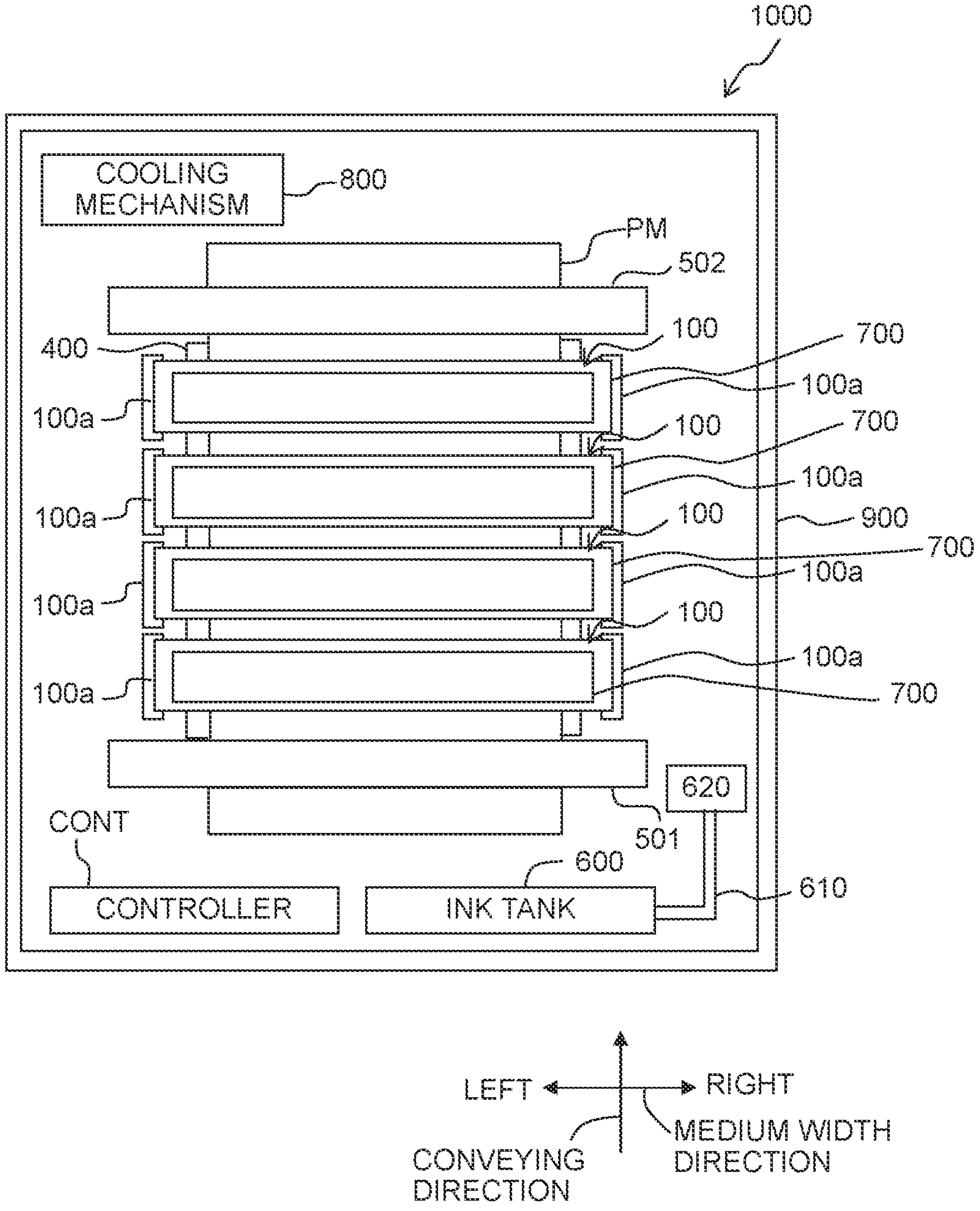
FIG. 1 is a plan view of a printer.

As depicted in FIG. 1, the printer 1000 is provided with four head unites 100, a platen 400, a pair of conveying rollers 501 and 502, a controller CONT and a casing 900 configured to accommodate the above-described components or elements. In the casing 900, an ink tank 600, four sub tanks 700 and a cooling mechanism 800 are further accommodated.

In the following explanation, a direction in which the pair of conveying rollers 501 and 502 are arranged, namely, a direction in which a medium PM is conveyed during an image formation is referred to as a conveying direction in the printer 1000. With respect to the conveying direction, an upstream side and a downstream side in the direction in which the medium PM is conveyed are referred, respectively, to as a supply side and a discharge side of the conveying direction.

Further, a direction in a horizontal plane orthogonal to the conveying direction, namely, a direction in which a rotational shaft of each of the conveying rollers 501 and 502 extends, is referred to as a medium width direction. With respect to the medium width direction, a left side and a right side in a case of seeing the discharge side from the supply side of the conveying direction are referred, respectively, to a left side and a right side of the medium width direction. A direction orthogonal to the conveying direction and the medium width direction is referred to as an up-down direction.

Each of the four head units 100 is a head of a so-called line type, and is supported by a supporting body 100*a* at both ends thereof in the medium width direction. In the present embodiment, the four head units 100 eject, respectively, inks of mutually different colors. Four color inks ejected by the four head units 100, respectively, are exemplified as a cyan ink, a magenta ink, a yellow ink and a black ink. The specific configuration and function of each of the four head units 100 will be described later on.

The platen 400 is a member which is plate-shaped and which is configured to support the medium PM from a side opposite to the four head units 100 (lower side) in a case that the ink(s) is (are) ejected from the head units 100 toward the medium PM. The width in the medium width direction of the platen 400 is greater than a width of a medium which is largest and on which an image recording by the printer 1000 is possible.

The pair of conveying rollers 501 and 502 are positioned in such a state that the pair of conveying rollers 501 and 502 sandwich the platen 400 therebetween in the conveying direction. The pair of conveying rollers 501 and 502 feed the medium PM to the discharge side of the conveying direction, in a predetermined aspect, during the image formation to the medium PM by the head units 100.

The ink tank 600 is partitioned into four parts so that the four color inks are accommodatable therein. Each of the four sub tanks 700 are positioned at a location above one of the four head units 100.

The four color inks are fed to a reservoir 620 by a pipeline 610. Each of the pipeline 610 and the reservoir 620 is partitioned into four parts so that the four color inks can be circulated and accommodated. Each of the four color inks fed to the reservoir 620 is circulated, via a non-illustrated pipeline and a non-illustrated pump, between one of the four sub tanks 700 and the reservoir 620.

Each of the four sub tanks 700 supplies ink (one of the four color inks) to a certain head unit 100 included in the four head units 100 and positioned immediately therebelow and recovers the ink from the certain head unit 100.

The cooling mechanism 800 mainly has a coolant tank, a pump, a coolant supplying tube and a coolant recovering tube (each of which is not depicted in the drawings). The cooling mechanism 800 causes the coolant to circulate between the coolant tank and the head module 1 (see FIG. 2) possessed by each of the head units 100, via the coolant supplying tube and the coolant recovering tube. It is possible to use, for example, cooling water as the coolant.

The controller CONT is configured to entirely control the respective parts or components provided on the printer 1000 so as to cause the respective parts or components to execute the image recording with respect to the medium PM, etc. The controller CONT is provided with: a FPGA (Field Programmable Gate Array), an EEPROM (Electrically Erasable Programmable Read-Only Memory; EEPROM is a registered trade mark of Renesas Electronics Corporation), a RAM (Random Access Memory), etc. Note that the controller CONT may be provided with a CPU (Central Processing Unit) or an ASIC (Application Specific Integrated Circuit), etc. The controller CONT is connected to an external apparatus or device such as a PC (not depicted in the drawings) to be capable of performing data communication therewith, and is configured to control the respective parts or components of the printer 1000 based on print data transmitted from the external apparatus.

Head Unit 100

Since the four head units 100 have a same configuration, one of the four head units 100 will be representatively explained in the following.

Figure 2:
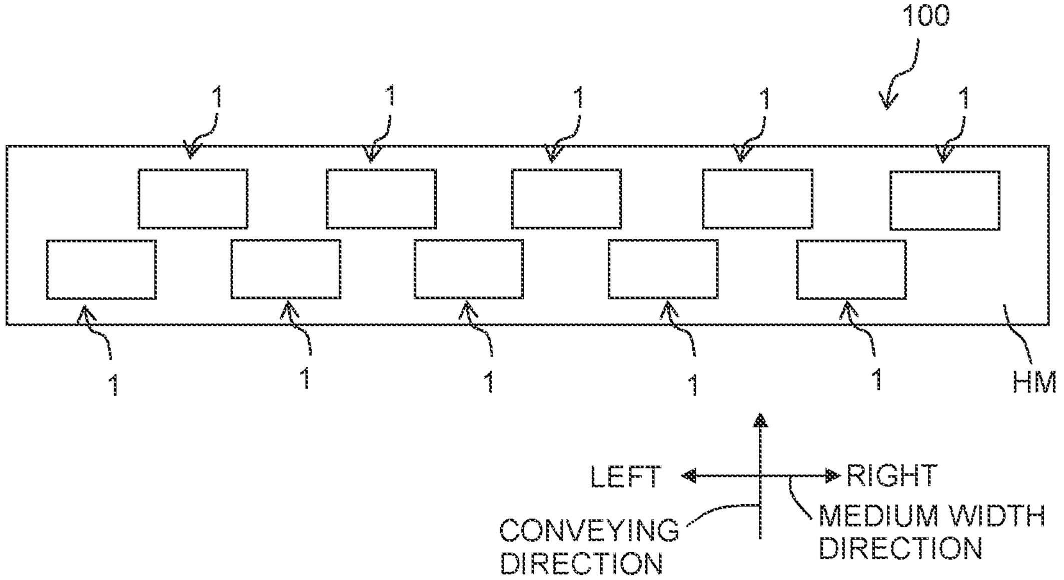
FIG. 2 is a top view of a head unit.

As depicted in FIG. 2, the head unit 100 is provided with a holding member HM and ten pieces of the head module 1 held by the holding member HM.

The holding member HM is a plate-shaped member which has a rectangular shape in a plan view and in which the medium width direction is a longitudinal direction and the conveying direction is a short direction. Both end parts in the longitudinal direction of the holding member HM are supported by the supporting body 100*a*.

The ten head modules 1 are integrally held by the holding member HM in a state that each of the ten head modules 1 is positioned in one of a plurality of opening parts (not depicted in the drawings) of the holding member HM. The ten head modules 1 are positioned, in a plan view, in a staggered manner (a zig-zag manner) along the medium width direction.

Head Module 1

Since the ten head modules 1 have a same configuration, one of the ten head modules 1 will be representatively explained in the following.

Figure 3:
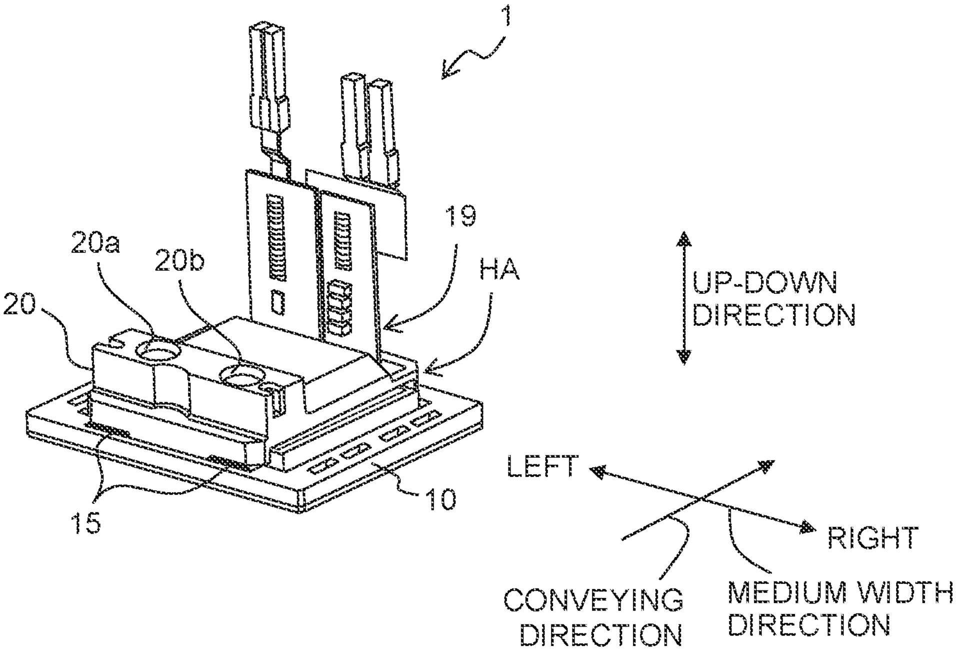
FIG. 3 is a perspective view of a head module.
Figure 4:
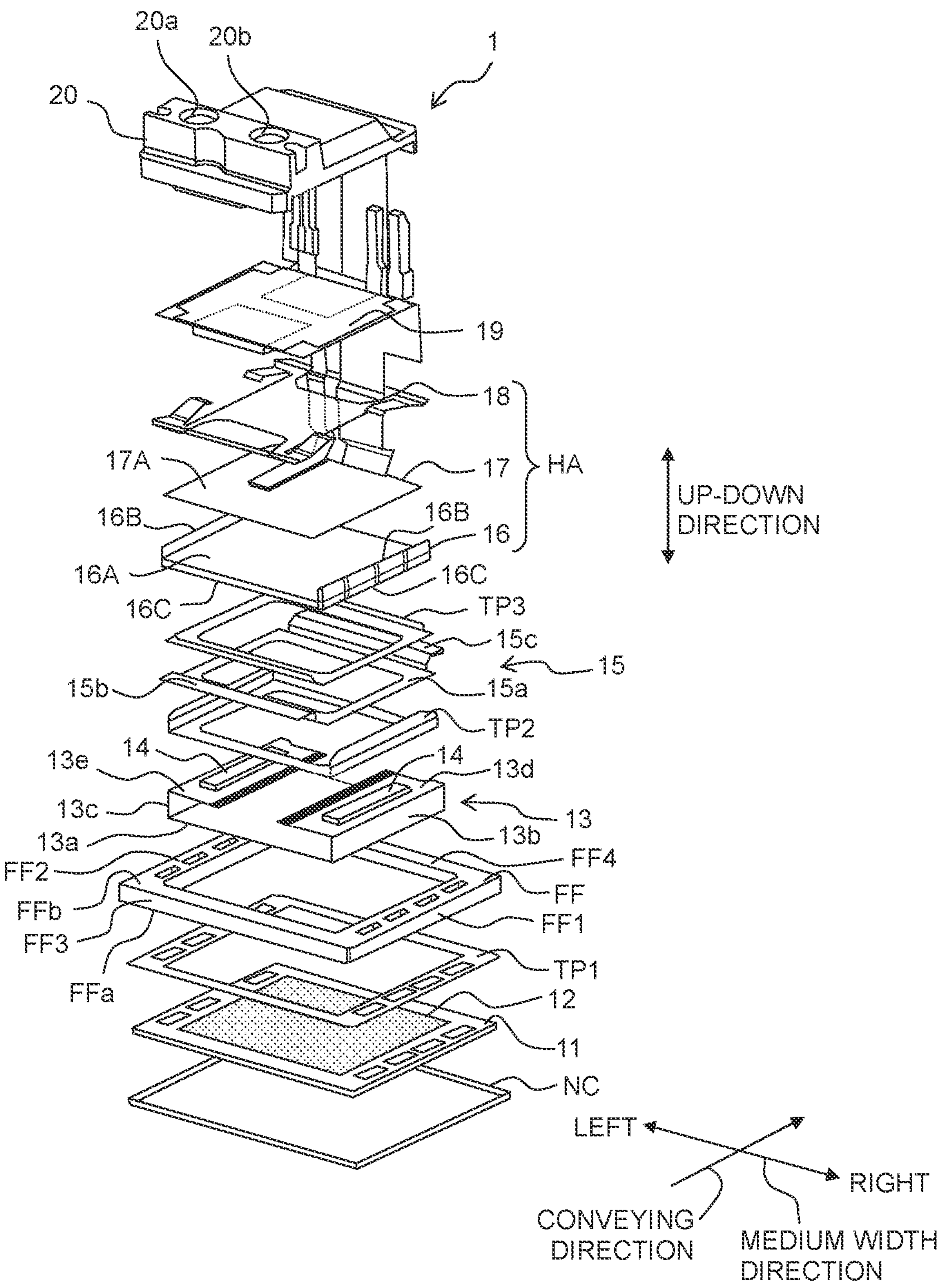
FIG. 4 is a exploded perspective view of the head module.

As depicted in FIGS. 3 and 4, the head module 1 mainly has a head chip 10, a heat conducting member 15, a heater assembly HA, a control substrate 19 and a cooler 20.

Head Chip 10

As depicted in FIG. 4, the head chip 10 has a nozzle cover NC, a channel member 11, a piezoelectric actuator 12, a frame member FF, a COF (Chip on Film) 13 and a driver IC 14. The piezoelectric actuator 12, the COF 13 and the driver IC 14 are an example of an "actuator".

Nozzle Cover NC

The nozzle cover NC is a member having a shape of a rectangular frame in a plan view. The nozzle cover NC is joined to an outer edge of a lower surface of the channel member 11, and protects a plurality of nozzles NZ (see FIG. 5) which are opened in the lower surface of the channel member 11.

Channel Member 11

Figure 5:
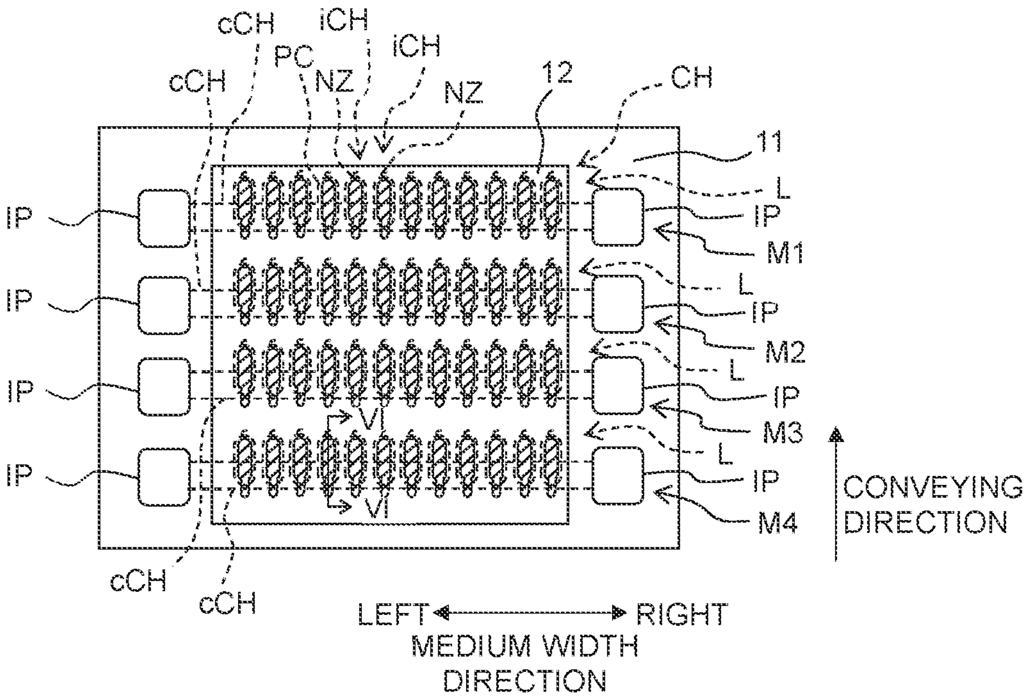
FIG. 5 is a top view depicting a channel member and a piezoelectric actuator.
Figure 6:
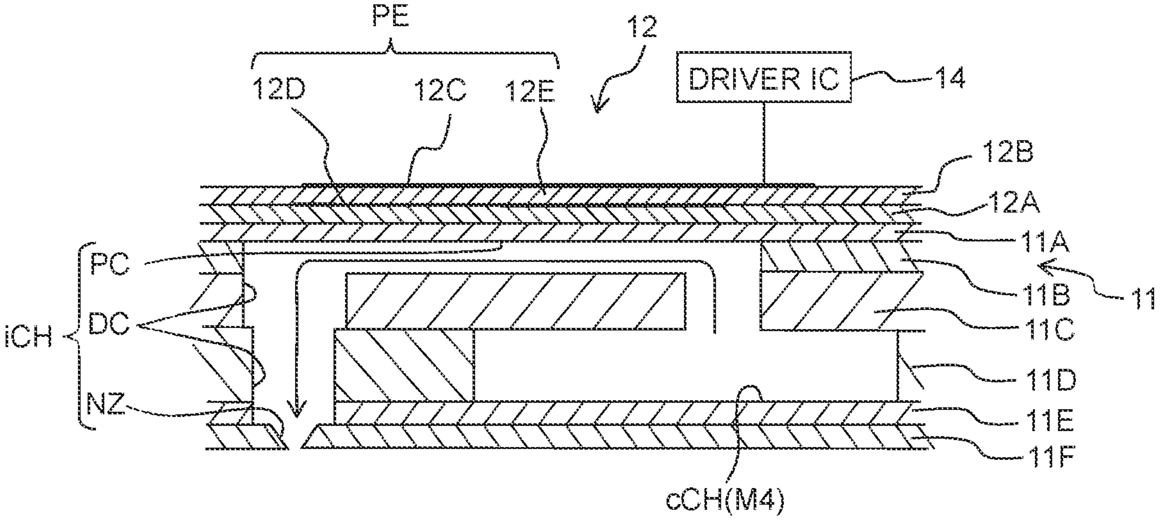
FIG. 6 is a cross-sectional view taken along a VI-VI line in FIG. 5.

As depicted in FIGS. 4 and 5, the channel member 11 is a plate-shaped member having a rectangular shape. As depicted in FIG. 6, the channel member 11 is construed by stacking an ink sealing film 11A, plates 11B to 11E and a nozzle plate 11F from the upper side in this order. As depicted in FIG. 6, a channel CH is formed in the channel member 11.

The channel CH includes four manifold channels M1, M2, M3 and M4 and 48 individual channels iCH. Each of the four manifold channels M1 to M4 includes a common channel cCH having a linear shape, and ink flow ports IP (inflow ports, discharge ports) which are provided on both end parts of the common channel cCH. 12 individual channels iCH are connected to each of the four manifold channels M1 to M4. Note that the number of the manifold channel and the number of the individual channel connected to each of the manifold channels are examples; the present teaching is not limited to or restricted by these numbers.

As depicted in FIG. 6, each of the individual channels iCH includes a pressure chamber PC, a descender channel DC and a nozzle NZ. An upper surface of the pressure chamber PC is defined by the ink sealing film 11A. The descender channel DC extends in the up-down direction from the pressure chamber PC toward the nozzle NZ. The nozzle NZ is a minute opening via which the ink is ejected toward the medium PM, and is formed in the nozzle plate 11F. As depicted in FIG. 5, four nozzle rows L are formed in a lower surface of the nozzle plate 11F. Each of the nozzle rows L extends along the direction in which the manifold channels M1 to M4 extend.

Piezoelectric Actuator 12

As depicted in FIG. 5, the piezoelectric actuator 12 has a rectangular outer shape which is one size smaller than the channel member 11. As depicted in FIG. 6, the piezoelectric actuator 12 has a first piezoelectric layer 12A provided on an upper surface of the channel member 11, a second piezoelectric layer 12B located above the first piezoelectric layer 12A, a plurality of individual electrodes 12C provided on an upper surface of the second piezoelectric layer 12B, and a common electrode 12D sandwiched by the first piezoelectric layer 12A and the second piezoelectric layer 12B. Each of the first piezoelectric layer 12A and the second piezoelectric layer 12B is formed of a piezoelectric material composed primarily of lead zirconate titanate, etc. In the second piezoelectric layer 12B, an active part 12E sandwiched by the common electrode 12D and each of the plurality of individual electrodes 12C is polarized in a thickness direction. The plurality of individual electrodes 12C are formed in an upper surface of the second piezoelectric layer 12B so that each of the plurality of individual electrodes 12C is positioned above the pressure chamber 13 of one of the plurality of individual channels iCH. Each of the plurality of individual electrodes 12C is formed with a contact point electrically connectable to a COF 13. The driver IC 14 mounted on the COF 13 is configured to selectively apply either one of a driving potential and a ground potential with respect to each of the plurality of individual electrodes 12C, based on a control of the controller CONT, via a wiring of the COF 13. The common electrode 12D is electrically connectable to the COF 13 via a through-electrode (not depicted in the drawings) which penetrates the second piezoelectric layer 12B in the thickness direction. The driver IC 14 mounted on the COF 13 maintains the common electrode 12D at the ground potential via the wiring of the COF 13 and the through-electrode. A plurality of piezoelectric elements PE is formed of the common electrode 12D, the plurality of individual electrodes 12C and a plurality of pieces of the active part 12E each of which is sandwiched between the common electrode 12D and one of the plurality of individual electrodes 12C.

Here, an explanation will be given about an operation of a piezoelectric element PE, of the plurality of piezoelectric elements PE, corresponding to one nozzle NZ of the plurality of nozzles NZ, communicating with the manifold channel M4, with a case wherein a droplet of ink (ink droplet) is ejected from the nozzle NZ.

Before the printer 1000 starts a recording operation, the driving potential is applied to the plurality of individual electrodes 12C. In this situation, an electric field which is downward in the up-down direction acts in the active part 12E, of the second piezoelectric layer 12B, sandwiched between the common electrode 12D and an individual electrode 12C, of the plurality of individual electrodes 12C, which corresponds to the nozzle NZ, due to a difference in the potential between the individual electrode 12C and the common electrode 12D. In this situation, a polarization direction (downward in the up-down direction) of the active part 12E is coincident with the direction of the electric field, and the active part 12E expands in the thickness direction of the second piezoelectric layer 12B (up-down direction) and contracts in a plane direction of the second piezoelectric layer 12B. Accompanying with the contraction deformation of the active part 12E, a part of the first piezoelectric layer 12A and a part of the ink sealing film 11A which overlap with a pressure chamber PC, of the plurality of pressure chambers PC, which corresponds to the nozzle NZ in the up-down direction are deformed so as to project toward the pressure chamber PC (are deformed to project downward). In this situation, the volume of the pressure chamber PC is small, as compared with a case that the first piezoelectric layer 12A and the ink sealing film 11A are flat.

In a case that the printer 1000 starts the recording operation and that the ink is ejected from the nozzle NZ, the potential of the individual electrode 12C corresponding to the nozzle NZ is switched from the driving potential to the ground potential. In this situation, since the difference in the potential between the individual electrode 12C and the common electrode 12D becomes small, the contraction of the active part 12E is released. With this, the part of the first piezoelectric layer 12A and the part of the ink sealing film 11A which overlap with the pressure chamber PC in the up-down direction are in the flat state. With this, the volume of the pressure chamber PC becomes great, thereby pulling the ink into the pressure chamber PC from the manifold channel M4.

Afterwards, the potential of the individual electrode 12C corresponding to the nozzle NZ is switched from the ground potential to the driving potential. In this situation, due to the difference in the potential between the individual electrode 12C and the common electrode 12D, the electric field which is downward same as the polarization direction of the active part 12E is generated in the active part 12E, which in turn causes the active part 12E to contract in the plane direction of the second piezoelectric layer 12B. With this, the part of the first piezoelectric layer 12A and the part of the ink sealing film 11A which overlap, in the up-down direction, with the pressure chamber PC are deformed so as to project toward the pressure chamber PC (are deformed to project downward). In this situation the volume of the pressure chamber PC is decreased greatly, thereby applying large pressure to the ink inside the pressure chamber PC, and to cause the ink pulled into the pressure chamber PC to be ejected, as an ink droplet, from the nozzle NZ.

Frame Member FF

Next, the frame member FF will be explained. The frame member FF is a frame-shaped member which is made of metal, which has a rectangular outer shape and which is formed by cutting out a central part of one piece of a plate-shaped member. In the present embodiment, a frame member FF made of SUS is used, as an example. A lower surface FFa of the frame member FF is joined to the upper surface of the channel member 11 via a double-sided adhesive tape TP1. With this, the frame member FF supports the channel member 11 and the piezoelectric actuator 12. As depicted in FIG. 4, the frame member FF has sides FF1 and FF2 which face each other in the medium width direction, and sides FF3 and FF4 which face each other in the conveying direction. Each of the sides FF1 and FF2 extends along the conveying direction. The side FF3 extends along the medium width direction from an end part on the upstream side in the conveying direction of the side FF1 up to an end part on the upstream side in the conveying direction of the side FF2. The side FF4 extends along the medium width direction from an end part on the downstream side in the conveying direction of the side FF1 up to an end part on the downstream side in the conveying direction of the side FF2. A size of an outer edge of the frame member FF is substantially same as a size of an outer edge of the channel member 11. On the other hand, a size of an inner edge of the frame member FF is one size greater than a size of an outer edge of the piezoelectric actuator 12. Further, in a state that the frame member FF is joined to the upper surface of the channel member 11, the entirety of the piezoelectric actuator 12 is positioned on the inner side with respect to the inner edge of the frame member FF. Each of the sides FF1 and FF2 of the frame member FF is formed with four through holes TH (see FIG. 7) corresponding, respectively, to the ink flow ports IP of the channel member 11. Each of the through holes TH penetrates through the frame member FF in the up-down direction, and overlaps in the up-down direction with one of the ink flow ports IP, of the channel member 11, corresponding thereto. Namely, each of the through holes TH is communicated with one of the ink flow ports IP, of the channel member 11, corresponding thereto. The frame member FF is an example of a "support" of the present teaching. The side FF3 and the side FF4 of the frame member FF are examples, respectively, of a "first side" and a "second side" of the present teaching; and the side FF1 and the side FF2 of the frame member FF are each an example of a "third side" of the present teaching. The lower surface FFa of the frame member FF is an example of a "first surface" of the present teaching; and the upper surface FFb of the frame member FF is an example of a "second surface" of the present teaching.

COF 13 and Driver IC 14

The COF 13 is positioned at a location above the piezoelectric actuator 12. The COF 13 is a wiring circuit substrate made of polyimide and having a shape of a film; the thermal conductivity of the COF 13 is lower than the thermal conductivity of the frame member FF. One end part in the medium width direction (right end part) of the COF 13 is bent upward along the inner edge (a left surface of the side FF1) of the frame member FF and then is bent leftward. The other end part in the medium width direction (left end part) of the COF 13 is bent upward along the inner edge (a right surface of the side FF2) of the frame member FF and then is bent rightward. Namely, the COF 13 has a part 13*a* which is parallel to the medium width direction and the conveying direction, a part 13*b* which extends upward from one end part in the medium width direction of the part 13*a* along the inner edge of the frame member FF, a part 13*c* which extends upward from the other end part in the medium width direction of the part 13*a* along the inner edge of the frame member FF, a part 13*d* which extends leftward from an upper end part of the part 13*b*, and a part 13*e* which extends rightward from an upper end part of the part 13*c*. A plurality of contact points (not depicted in the drawings), each of which is electrically connectable to one of a plurality of pieces of the contact point formed in the plurality of individual electrodes 12C of the piezoelectric actuator 12, are formed in a lower surface of the part 13*a*. Further, the driver IC 14 is mounted in each of the part 13*d* and the part 13*e*.

Heat Conducting Member 15

Figure 7:
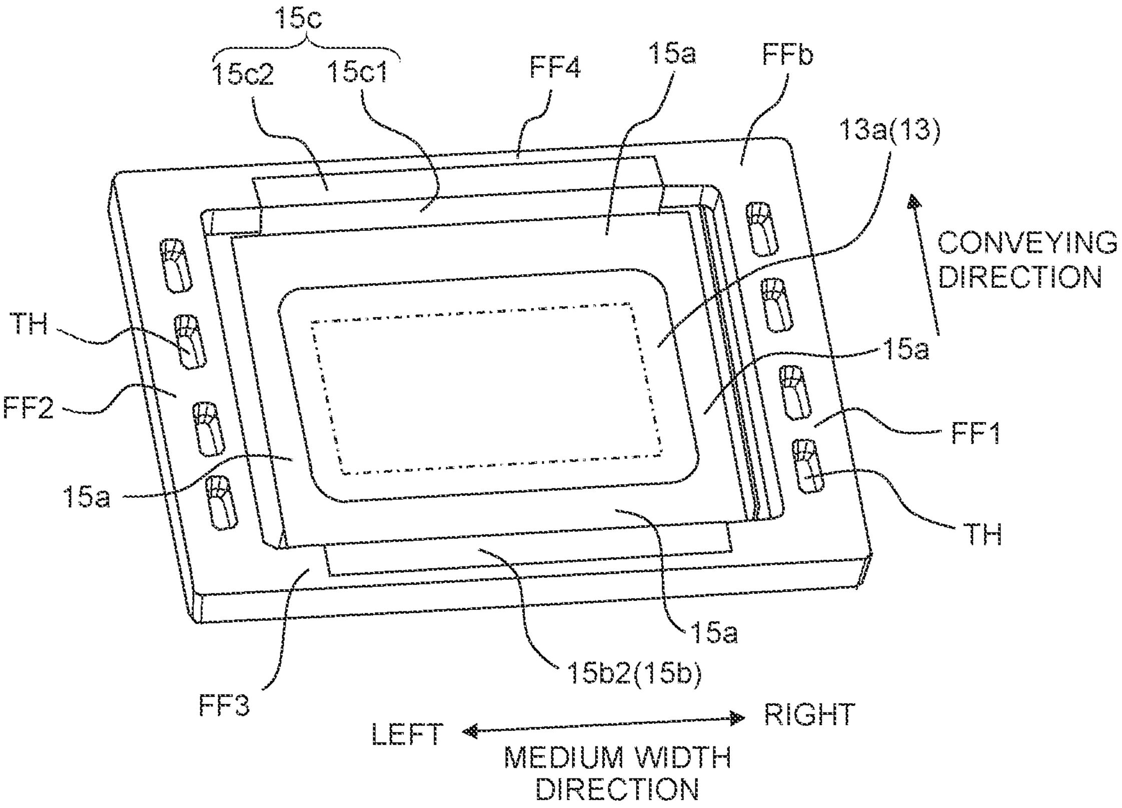
FIG. 7 is a perspective view for explaining a shape of a heat conducting member.
Figure 8:
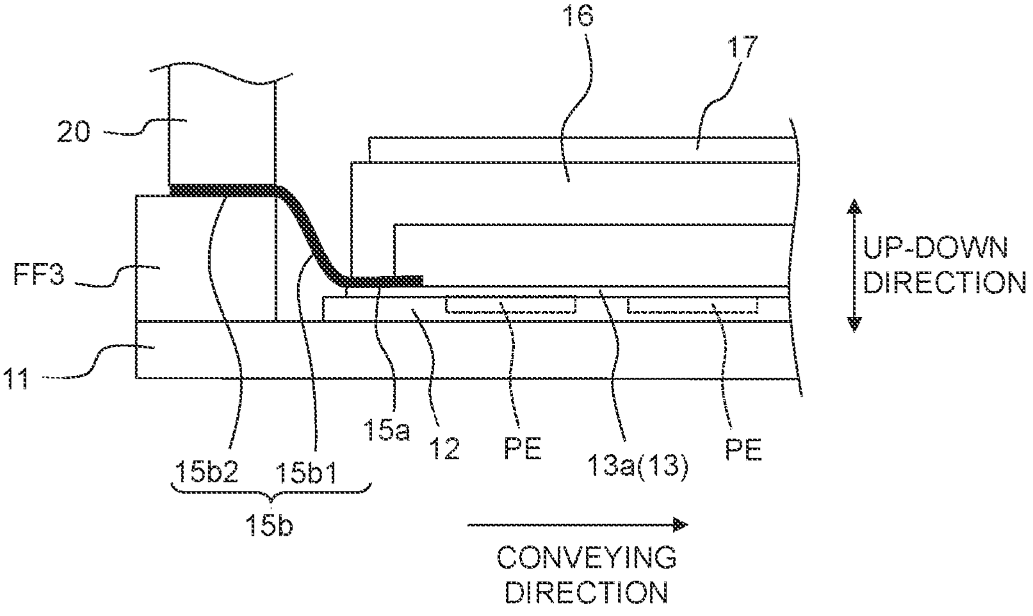
FIG. 8 is a cross-sectional view of a part of the head module.

The heat conducting member 15 is a sheet which is frame-shaped and of which central part is cut out. In the present embodiment, a sheet made of graphite is used as the heat conducting member 15; the heat conductivity of the heat conducting member 15 is higher than the heat conductivity of the frame member FF (which is made, for example, of SUS). As depicted in FIGS. 4 and 7, the heat conducting member 15 has a frame-shaped part 15*a* of which central part is cut out, and projecting parts 15*b* and 15*c*. The projecting part 15*b* projects from an edge on the upstream side in the conveying direction of the frame-shaped part 15*a* toward the upstream side in the conveying direction. The projecting part 15*c* projects from an edge on the downstream side in the conveying direction of the frame-shaped part 15*a* toward the downstream side in the conveying direction. As depicted in FIG. 8, the projecting part 15*b* has an inclined part 15*b*1 which extends upward and toward the upstream side in the conveying direction, from the edge on the upstream end in the conveying direction of the frame-shaped part 15*a*; and an extending part 15*b*2 which extends toward the upstream side in the conveying direction, from an upper end of the inclined part 15*b*1. Further, as depicted in FIG. 7, the projecting part 15*c* has an inclined part 15*c*1 which extends upward and toward the downstream side in the conveying direction, from the edge on the downstream end in the conveying direction of the frame-shaped part 15*a*; and an extending part 15*c*2 which extends toward the downstream side in the conveying direction, from an upper end of the inclined part 15*c*1.

A lower surface of the frame-shaped member 15*a* is joined to the upper surface of the part 13*a* of the COF 13 via a double-sided adhesive tape TP2 (see FIG. 4). Further, the heat conductivity of the double-sided adhesive tape TP2 is higher than the head conductivity of the COF 13. Namely, the frame-shaped part 15*a* is in thermal contact with the part 13*a* of the COF 13. Note that in the present specification, the phrase "thermal contact" includes not only direct contact but also contact via a heat transferrable member. A case that a space is present between two members, namely, a case that the two members are not in contact with each other, and a case that another member is positioned between the two members and that the another member is not in contact with both of the two members are not included in the case of "thermal contact". Further, in a state that the lower surface of the frame-shaped part 15*a* is joined to the upper surface of the part 13*a*, a lower surface of the extending part 15*b*2 is in contact with the upper surface FFb of the side FF3 in the frame member FF, and a lower surface of the extending part 15*c*2 is in contact with the upper surface FFb of the side FF4 in the frame member FF. Namely, the extending part 15*b*2 is in thermal contact with the side FF3 of the frame member FF, and the extending part 15*c*2 is in thermal contact with the side FF4 of the frame member FF. On the other hand, the heat conducive member 15 is not in thermal contact with the side FF1 and the side FF2 of the frame member FF. The heat conductivity of the heat conducting member 15 is higher than the heat conductivity of the double-sided adhesive tape TP2, and as described above, the heat conductivity of the double-sided adhesive tape TP2 is higher than the heat conductivity of the COF 13.

Furthermore, in the state that the lower surface of the frame-shaped part 15*a* is joined to the upper surface of the part 13*a* of the COF 13, the frame-shaped part 15*a* and the plurality of piezoelectric elements PE of the piezoelectric actuator 12 do not overlap with each other in the up-down direction. Namely, the plurality of piezoelectric elements PE of the piezoelectric actuator 12 are positioned on the inner side with respect to the inner edge of the frame-shaped part 15*a* (within a rectangular area indicated by one-dot chain lines in FIG. 7), and the frame-shaped part 15*a* surrounds the plurality of piezoelectric elements PE. The heat conducting member 15 is an example of a "heat conductor" of the present teaching. The frame-shaped part 15*a*, the extending part 15*b*2 and the extending part 15*c*2 of the heat conducting member 15 are examples, respectively, of a "second contacting part", a "first contacting part" and a "third contacting part" of the present teaching.

Heater Assembly HA

The heater assembly HA is configured to apply heat to the channel member 11 and the piezoelectric actuator 12 so as to heat the ink flowing in the channel member 11. As depicted in FIG. 4, the heater assembly HA has a heat conducting member 16, a film heater 17 and a plate spring 18.

The heat conducing member 16 is formed of a metal having a high heat conductivity, such as, for example, aluminum. As depicted in FIG. 4, the heat conducting member 16 has a plate part 16A having a substantially square shape in a plan view, a pair of wall parts 16B projecting upward from both ends in the medium width direction of the plate part 16A, and a projecting part 16C which is frame-shaped and which projects downward from an outer edge of a lower surface of the plate part 16A. A lower end part of the frame-shaped projecting part 16C is joined to an upper surface of the frame-shaped part 15*a* of the heat conducting member 15, via a double-sided adhesive tape TP3. With this, the frame-shaped projecting part 16C of the heat conducting member 16 and the frame-shaped part 15*a* of the heat conducting member 15 are in thermal contact with each other. Namely, as depicted in FIG. 8, the frame-shaped part 15*a* of the heat conducting member 15 is sandwiched between the part 13*a* of the COF 13 and the projecting part 16C of the frame-shaped heat conducting member 16. Further, in other words, the frame-shaped projecting part 16C of the heat conducting member 16 is in contact with a peripheral edge part of the upper surface of the piezoelectric actuator 12, via the frame-shaped part 15*a* of the heat conducting member 15 and the part 13*a* of the COF 13. More specifically, the frame-shaped projecting part 16C of the heat conducting member 16 is in thermal contact with an area between the plurality of individual electrodes 12C of the piezoelectric actuator 12 and the outer edge of the piezoelectric actuator 12. Note that in FIG. 8, the illustration of the double-sided adhesive tapes TP1, TP2 and TP3 are omitted. Further, although FIG. 8 depicts only the cross-sectional structure on the upstream side in the conveying direction and the cross-sectional structure on the downstream side in the conveying direction is omitted, the cross-sectional structure on the downstream side in the conveying direction is same as the cross-sectional structure on the upstream side in the conveying direction.

The film heater 17 is located above the heat conducting member 16. The film heater 17 has a heating surface 17A formed of a resin such as polyimide, etc.; the heating surface 17A is brought into contact with the upper surface of the plate part 16A of the heat conducting member 16. The heat generated in the film heater 17 is applied to the channel member 11 and the piezoelectric actuator 12 via the heat conducting member 16, the frame-shaped part 15*a* of the heat conducting member 15 and the part 13*a* of the COF 13.

The plate spring 18 is positioned above the film heater 17. The plate spring 18 is in contact with the upper surface of the film heater 17 so as to urge the heating surface 17A of the film heater 17 toward the heat conducting member 16 and is in contact with the lower surface of the control substrate 19 so as to urge the control substrate 19 upward. In a state that the head module 1 is assembled as depicted in FIG. 3, the heat conducting member 15, the heater assembly HA and the control substrate 19 are positioned, in the up-down direction, between the part 13*a*, and the parts 13*d* and 13*e* of the COF 13.

Cooler 20

As depicted in FIGS. 3 and 4, a coolant supplying port 20*a* and a coolant recovering port 20*b* are opened in an upper surface of the cooler 20. Further, a non-illustrated coolant channel configured to cause the coolant supplying port 20*a* and the coolant recovering port 20*b* to communicate with each other is formed in the cooler 20. The coolant supplying tube of the cooling mechanism 800 is connected to the coolant supplying port 20*a*, and the coolant recovering tube of the cooling mechanism 800 is connected to the coolant recovering port 20*b*. The coolant is supplied from the coolant tank of the cooling mechanism 800 to the coolant channel, via the coolant supplying tube and the coolant supplying port 20*a*. Then, the coolant which has flowed in the coolant channel is recovered to the coolant tank via the coolant recovering port 20*b* and the coolant recovering tube. An end part on the upstream side in the conveying direction of the cooler 20 is fixed to the side FF3 of the frame member FF with, for example, a screw, etc., via the extending part 15*b*2 of the heat conducting member 15. Namely, as depicted in FIG. 8, the end part on the upstream side in the conveying direction of the cooler 20 is in contact with the extending part 15*b*2 of the heat conducting member 15. With this, the extending part 15*b*2 of the heat conducting member 15 is in contact not only with the side FF3 of the frame member FF but also with the end part on the upstream side in the conveying direction of the cooler 20. Further, in a state that the end part on the upstream side in the conveying direction of the cooler 20 is fixed to the side FF3 of the frame member FF, a part of the lower surface of the cooler 20 is in contact with two pieces of the driver IC 14 which are positioned, respectively, in the upper surface of the part 13*d* and the upper surface of the part 13*e* of the COF 13. Then, the heat generated from the driver ICs 14 in a case that the piezoelectric elements PE are driven is absorbed by the coolant flowing in the coolant channel of the cooler 20. The cooler 20 is an example of a "coolant circulator" of the present teaching.

In the present embodiment, the heat conducting member 15 has the extending part 15*b*2 and the extending part 15*c*2 which are in contact, respectively, with the side FF3 and the side FF4 of the frame member FF, and the frame-shaped part 15*a* which is in contact with the piezoelectric actuator 12 via the part 13*a* of the COF 13. Owning to this, it is possible to transfer the heat, which is generated by the driving of the plurality of piezoelectric elements PE possessed by the piezoelectric actuator 12, to the frame member FF via the heat conducting member 15. Namely, it is possible to release the heat from the piezoelectric actuator 12 in the plane direction of the head chip 10, specifically, toward the upstream side and the downstream side of the conveying direction with respect to the piezoelectric actuator 12. On the other hand, the frame-shaped part 15*a* of the heat conducting member 15 is also in contact with the frame-shaped projecting part 16C of the heat conducting member 16. Owing to this, the heat from the film heater 17 can be transferred to an outer peripheral part of the piezoelectric actuator 12 via the projecting part 16C of the heat conducting member 16, the frame-shaped part 15*a* of the heat conducting member 15, and the part 13*a* of the COF 13. Namely, the heat from the heater assembly HA can be transferred to the thickness direction of the head chip 10. Here, the heat conductivity becomes low in an order of: the heat conducting member 15, the frame member FF, the double-sided adhesive tapes TP2 and TP3, and the COF 13. Further, in a case that the cross-sectional area and the distance in a heat conducting route in each of the respective members as describe above, the thermal resistance in each of the respective members becomes small in an order of: the double-sided adhesive tapes TP2 and TP3, the COF 13, the heat conducting member 15 and the frame member FF. Namely, the heat conducting member 15 is configured to transfer (conduct) the heat more easily than the COF 13, and the frame member FF is configured to transfer the heat more easily than the heat conducting member 15. Accordingly, the heat is transferred from the heat conducting member 15 to the frame member FF more easily than from the heat conducting member 15 to the COF 13. As a result, it is possible to suppress any increase in the temperature by the driving of the piezoelectric actuator 12 while uniformizing the temperature of the ink in the inside of the channel member 11. Namely, it is possible to perform a temperature control highly precisely with respect to the ink inside the channel member 11. Further, since the side FF3 and the side FF4 of the frame member FF are separated away from each other in the conveying direction, it is possible to effectively release the heat from the piezoelectric actuator 12 by dispersing the heat to the upstream side and the downstream side of the conveying direction.

Further, in a state that the lower surface of the frame-shaped part 15*a* is joined to the upper surface of the part 13*a* of the COF 13, the frame-shaped part 15*a* and the plurality of piezoelectric elements PE of the piezoelectric actuator 12 do not overlap in the up-down direction. Namely, the plurality of piezoelectric elements PE of the piezoelectric actuator 12 is positioned on the inner side with respect to the inner edge of the frame-shaped part 15*a*, and the frame-shaped part 15*a* surrounds the plurality of piezoelectric elements PE. Owing to this, the frame-shaped part 15*a* does not hinder the driving of the plurality of piezoelectric elements PE. Further, the heat conducting member 15 can be prepared by processing one material, thereby making it possible to reduce the number of a manufacturing step as compared with a case of assembling the heat conducting member 15 with a plurality of parts or components.

Furthermore, the projecting part 15*b* of the heat conducting member 15 has the inclined part 15*b*1 and the extending part 15*b*2, and the projecting part 15*c* of the heat conducting member 15 has the inclined part 15*c*1 and the extending part 15*c*2. Namely, since the inclined part 15*b*1 is interposed in an area from the frame-shaped part 15*a* up to the extending part 15*b*2 and the inclined part 15*c*1 is interposed in an area from the frame-shaped part 15*a* up to the extending part 15*c*2, it is possible to greatly reduce the heat transferred (conducted) from the frame-shaped part 15*a* to each of the extending parts 15*b*2 and 15*c*2 as compared with a case that the inclined part 15*b*1 is not interposed in the area from the frame-shaped part 15*a* up to the extending part 15*b*2 and the inclined part 15*c*1 is not interposed in the area from the frame-shaped part 15*a* up to the extending part 15*c*2.

Moreover, the extending part 15*b*2 of the heat conducting member 15 is also in contact with the cooler 20. Owing to this, it is possible to release the heat from the piezoelectric actuator 12 further effectively.

Further, the heat conducting member 15 is not in contact with the side FF1 and the side FF2 of the frame member FF. Owing to this, the heat from the heater assembly HA and/or the heat from the piezoelectric actuator 12 is/are less likely to be transferred to the ink supplied to the through holes TH of each of the side FF1 and the side FF2, as compared with a case that the heat conducting member 15 is in contact with the side FF1 and the side FF2 of the frame member FF. Accordingly, even in a case that the head module 1 has the heat conducting member 15, any change in the viscosity of the ink to be supplied to the inside of the head chip 10 is less likely to occur.

Modifications

In the foregoing, although the present embodiment of the present teaching has been explained, the present teaching is not limited to the above-described embodiment, and various design changes can be made within the scope of the claims.

In the head module 1 of the above-described embodiment, although the double-sided adhesive tapes TP1, TP2 and TP3 are used, the present teaching is not limited or restricted by this. For example, it is allowable to use an adhesive of a sheet type.

Although the printer 1000 in the above-described embodiment is the printer of the so-called line system provided with the head units 100 of the line type, the present teaching is not limited to this. For example, it is allowable to apply the present teaching to a printer of a so-called serial system in which the ink(s) is (are) ejected from the plurality of nozzles 15 to the medium PM while moving the head module 1 in a scanning direction together with a carriage.

The liquid ejected from the nozzles 15 is not limited to the ink, and may be any liquid different from the ink (for example, a treatment liquid which agglutinates or precipitates a component in the ink, etc.).

The medium PM may be, for example, paper, cloth (fabric), a resin member, etc.

The above-described embodiment and the modifications thereof are merely examples in view of all the points, and should be considered to be not intended to limit or restrict the present teaching in any way. For example, the number, the configuration, etc., of the head unit 100 may be changed. There is also no limitation to the number of the color which is printable by the printer 1000 at a time, and the printer 1000 may have a configuration capable of performing only a single color printing. Further, the number, shape, position, etc., of the variety of kinds of channels may also be changed appropriately.

What is claimed is:

1. A head module, comprising:

a head chip having an actuator, a channel member having a channel deformable by the actuator, and a support made of metal, the support being in direct contact with the channel member and supporting the channel member;

a heater assembly; and a heat conductor, wherein the heat conductor has a first contacting part in thermal contact with the support, and a second contacting part in thermal contact with the heater assembly and the actuator.

2. The head module according to claim 1, wherein the heat conductor further has a third contacting part in thermal contact with the support, the support is a frame member having a rectangular outer shape, the first contacting part is in thermal contact with a first side of the support, and the third contacting part is in thermal contact with a second side of the support.

3. The head module according to claim 2, wherein the first side and the second side of the support face each other.

4. The head module according to claim 3, wherein a third side of the support has a supply port through which ink is supplied to the head chip, and the heat conductor is not in thermal contact with the third side of the support.

5. The head module according to claim 2, wherein the heat conductor is a sheet having a frame shape.

6. The head module according to claim 1, wherein the actuator comprises a piezoelectric actuator and a wiring circuit substrate electrically connected to the piezoelectric actuator, and the second contacting part of the heat conductor is sandwiched between the heater assembly and the wiring circuit substrate of the actuator.

7. The head module according to claim 6, wherein the piezoelectric actuator comprises a plurality of piezoelectric elements, the second contacting part of the heat conductor has a frame shape, and the piezoelectric elements of the piezoelectric actuator are positioned inside an inner edge of the second contacting part.

8. The head module according to claim 6, wherein a heat conductivity of the heat conductor is higher than a heat conductivity of the support, and the heat conductivity of the support is higher than a heat conductivity of the wiring circuit substrate.

9. The head module according to claim 1, wherein the support has a first surface and a second surface facing each other, the first surface of the support is joined to the channel member, and the first contacting part of the heat conductor is in thermal contact with the second surface of the support.

10. The head module according to claim 1, further comprising a coolant circulator fixed to the support, wherein the first contacting part of the heat conductor is further in thermal contact with the coolant circulator.

* * * * *